United States Patent [19]

Tice

[11] Patent Number: 5,533,687

[45] Date of Patent: Jul. 9, 1996

[54] LOW TORQUE MEDIA TAKE-UP DEVICE

[75] Inventor: William W. Tice, Nashua, N.H.

[73] Assignee: Miles Inc., Wilmington, Mass.

[21] Appl. No.: 156,076

[22] Filed: Nov. 23, 1993

[51] Int. Cl.$^6$ ............................. G03B 17/26; B65H 18/10; B65H 75/48

[52] U.S. Cl. ................... 242/348.1; 242/532.5; 242/532.6; 242/534; 242/586.5

[58] Field of Search ................. 242/532.5, 532.6, 242/532.7, 534, 587.2, 587.3, 332.7, 332.8, 348.1, 586.5

[56] References Cited

U.S. PATENT DOCUMENTS

| | | | |
|---|---|---|---|
| 2,631,349 | 3/1953 | Houston | 242/586.5 X |
| 3,670,981 | 6/1972 | Cavella | |
| 4,010,912 | 3/1977 | Dreher et al. | 242/587.2 X |
| 4,099,682 | 7/1978 | Benuska | 242/587.2 X |
| 4,126,875 | 11/1978 | Wareham | |
| 4,551,127 | 11/1985 | Rich et al. | 242/586.5 X |
| 5,197,687 | 3/1993 | Yamada et al. | 242/532.5 |

*Primary Examiner*—John M. Jillions
*Attorney, Agent, or Firm*—Julie A. Krolikowski

[57] ABSTRACT

A take-up roller for winding a continuous recording medium has an outer hollow cylindrical tube with a longitudinal slot and an inner hollow cylindrical tube with a longitudinal slot. The inner hollow cylindrical tube is mounted concentrically within the outer hollow cylindrical tube. Two eccentrically mounted weights are fastened on opposite sides of the inner tube slot, keeping the inner tube oriented with its slot facing downward. The outer tube is driven by a drive motor to rotate the outer tube relative to the inner tube until a sensor signals the drive motor to stop upon the alignment of the tube slots. A leading edge of the recording medium is inserted into the center of the inner tube though an opening formed by the alignment of the slots. Then, the outer tube is rotated relative to the inner tube, thereby closing the opening and wrapping the recording medium around the edge of the outer tube slot. A friction force is created between the tubes, due to the presence of the media between the tube slot edges, causing the inner tube to rotate with the outer tube. A one-way roller clutch system connects the tubes and prevents any relative rotation between the tubes to maintain the opening in its closed position during winding.

10 Claims, 3 Drawing Sheets

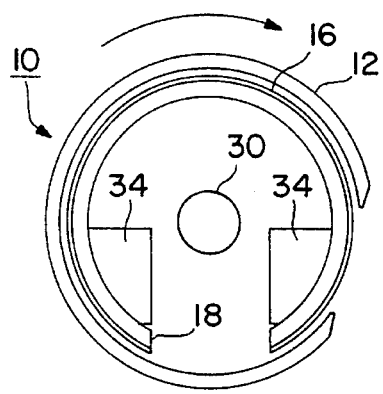
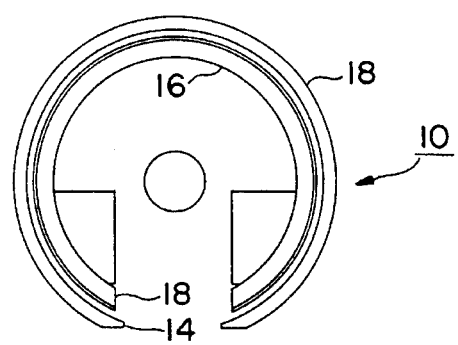
FIG. 3A  FIG. 3B
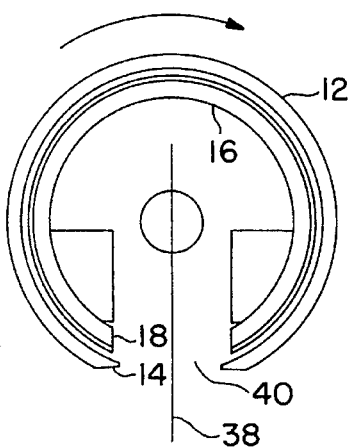
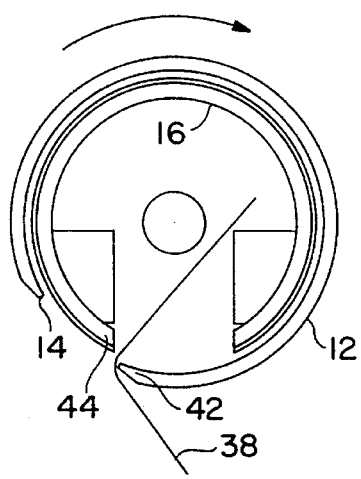
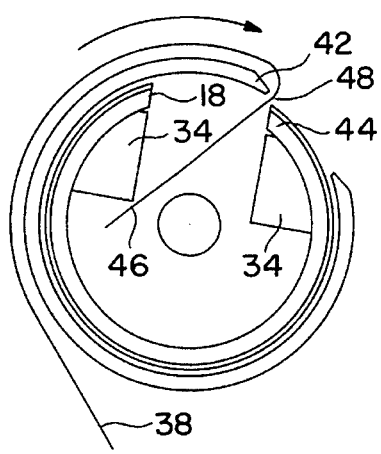
FIG. 4A  FIG. 4B  FIG. 4C
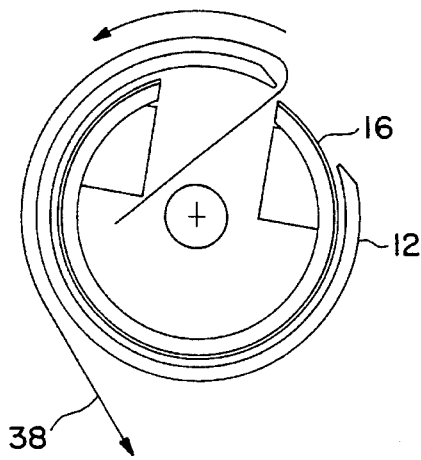
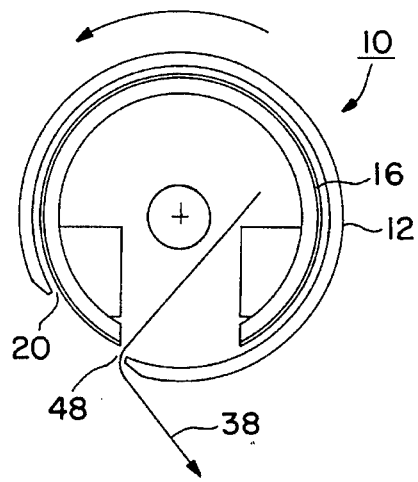
FIG. 5A  FIG. 5B

LOW TORQUE MEDIA TAKE-UP DEVICE

BACKGROUND OF THE INVENTION

The present invention relates to a take-up cassette for web-type recording medium, having a motor driven take-up roller with a core that is provided with a mechanism for capturing the leading edge of media in the core of the roller when winding the media and for releasing the leading edge of media when unwinding the media.

The invention is an improvement over non-powered scroll style cassettes, in which media is simply pushed into a loose spiral of a cylindrical chamber. As the media is pushed into the loose spiral, the diameter of the cylindrical chamber expands. There are several problems with) this type of take-up cassette. For instance, the scroll style cassettes have a limited inner diameter in which it is difficult to get a tightly wrapped roll of media, limiting the take-up capacity. Also, the soft photographic emulsion coating on film types of media is prone to scratching as the advancing media slides against itself as it coils within the spiral. Further, the electrically insulated properties of typical spiral material, such as plastic coated spring steel; enhance the build up of static charges on the media as it is pushed into the take-up cassette. Lastly, the force required to feed the media into the take-up cassette increases as the cassette becomes full, influencing the performance of the media transport system.

Media cassettes of the motor driven type have an advantage over the above spiral type take-up cassettes, in that the media can be tightly wound on the core of a motor driven take-up roller with the result that a greater quantity of media can be fed into a comparable size cassette. Also, the layers of media do not slide against each other as they do when the media is pushed into a spiral type cassette, thus decreasing the potential for scratching and electrostatic build-up.

It is a general object of the invention to provide a motorized take-up cassette that can be used without adjustment for width or thickness when using common imaging media such as paper or polymer based photographic and photolithographic graphic arts media including direct-to-plate materials.

Another object of the invention is to provide an automatic take-up roller that is capable of capturing a leading edge of a continuous recording medium when the recording medium is wound around the take-up roller, and that is capable of releasing the leading edge when the recording medium is unwound from the take-up roller.

It is a specific object of the invention to provide a clamping mechanism of a take-up roller with means to prevent material from slipping out from the clamping mechanism during winding.

SUMMARY OF THE INVENTION

A take-up roller for winding a continuous recording medium has an outer hollow cylindrical tube having a longitudinal slot and an inner hollow cylindrical tube having a longitudinal slot. The inner hollow cylindrical tube is mounted concentrically within the outer hollow cylindrical tube along a rotational axis. A drive means is provided for rotationally driving said outer hollow cylindrical tube about the rotational axis and clutch means are provided for preventing relative rotation between the outer and inner hollow cylindrical tubes about the rotational axis after the drive means rotates the outer hollow cylindrical tube relative to the inner hollow cylindrical tube by a predetermined amount.

BRIEF DESCRIPTION OF THE DRAWINGS

The features and objects of the invention will become apparent in the following description taken with the accompanying drawings, in which:

FIGS. 3a and 3b are sequential side views of the take-up roller assembly of FIG. 1 during stages of an aligning mode.

FIGS. 4a, 4b, and 4c are sequential side views of the take-up roller assembly of FIG. 1 during stages of a winding mode.

FIGS. 5a and 5b are sequential side views of the take-up roller assembly of FIG. 1 during stages of an unwinding mode.

DETAILED DESCRIPTION OF THE INVENTION

Figure 1:
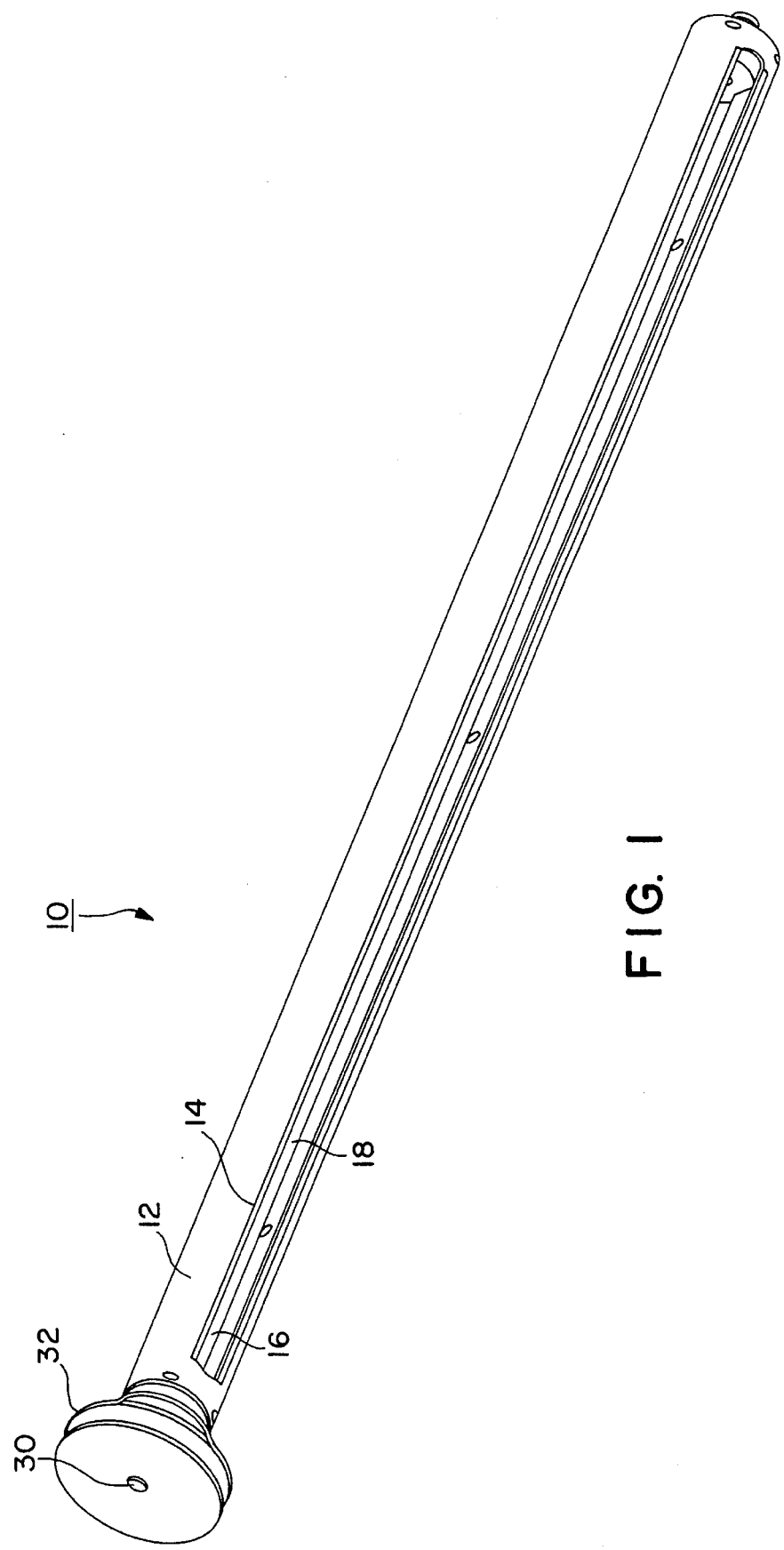
FIG. 1 is an isometric view of a take-up roller assembly.

Referring to FIG. 1, a take-up roller assembly, generally referred to by reference numeral 10, has an outer hollow cylindrical tube 12 with a slot 14 extending longitudinally along the length of the outer tube 12. An inner hollow cylindrical tube 16 with a longitudinally extending slot 18 is concentrically mounted within the outer tube 12. A small clearance 20 is provided between the outer diameter of the inner tube 16 and the inner diameter of the outer tube 12 so that the tubes 12, 16 may rotate relative to each other.

Figure 2:
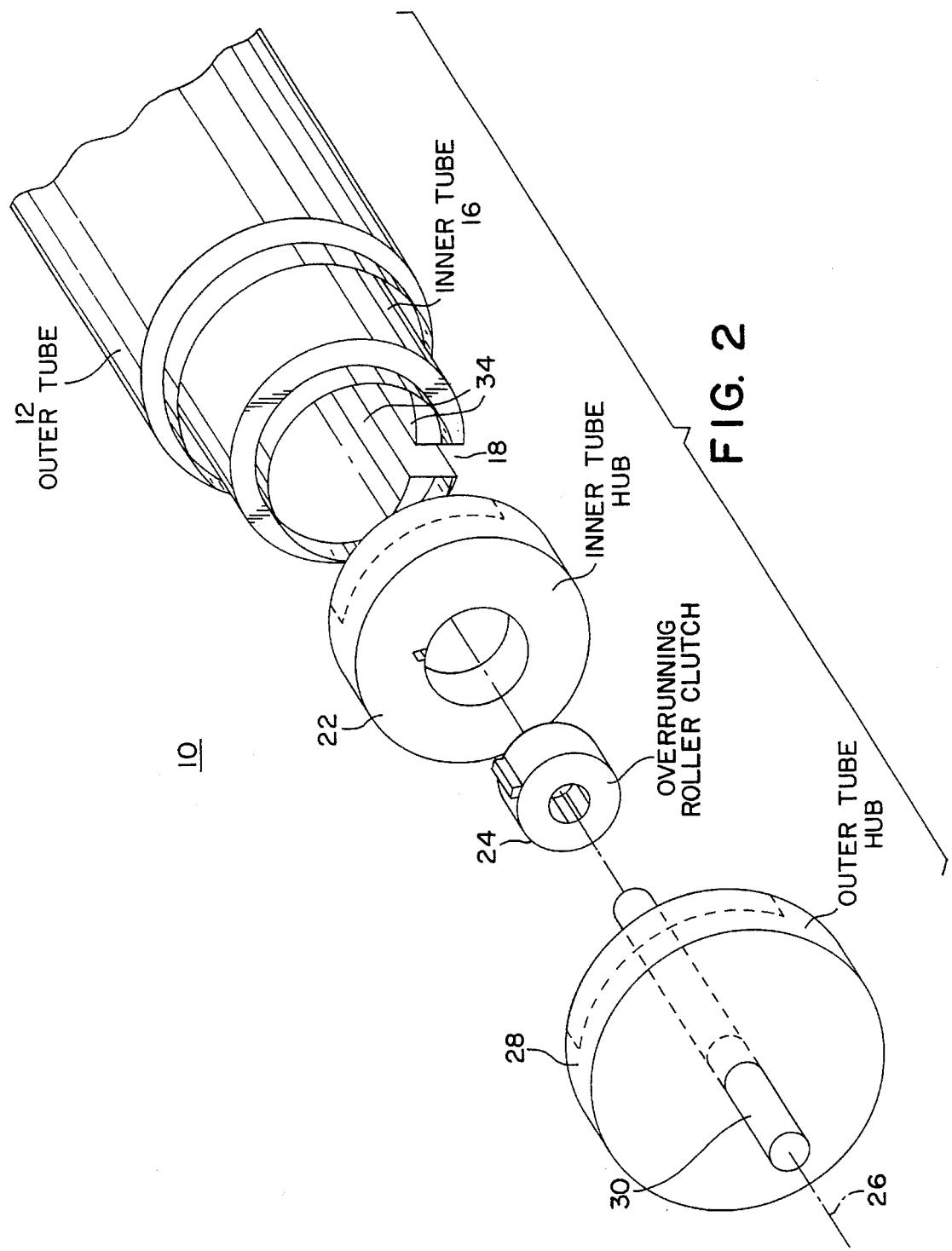
FIG. 2 is an assembly drawing of the concentrically mounted tubes of the take-up roller assembly of FIG. 1.

Referring now to FIG. 2, the inner tube 16 has hubs 22 at each end with roller clutches 24 mounted in alignment with the axis of rotation 26 of the take-up roller assembly 10. The outer tube 12 has hubs 28 on each end that have shafts 30 outside of the outer tube 12 for mounting. The take-up roller assembly 10 is normally mounted for rotation within a light-tight enclosure (not shown). One of the end shafts 30 extends through the enclosure wall and carries a drive wheel 32 that is driven by a friction wheel or by other suitable means (not shown) externally of the enclosure. The shafts 30 also extend inside of the outer tube 12 to mount the roller clutches 24 of the inner tube 16 thereon, providing one-way rotation between the inner and outer tubes.

The inner tube 16 is eccentrically weighted to orient its slot 18 downwardly. Two weights 34 are fastened to the inside of the tube 16 along the opposite sides of the inner tube slot 18, and extend along the length of the inner tube slot 18.

Now, with reference to FIGS. 3a–b, the operation of the take-up roller 10 will be described beginning with the alignment mode. First the outer tube 12 is rotated about axis 26 into alignment with the inner tube 16 by the external drive motor and friction wheel (not shown) rotating the drive wheel 32 (clockwise in FIG. 3a). The inner tube 16 has its slot 18 oriented downwardly due to the eccentrically mounted weights 34 fastened inside the inner tube 16. The outer tube 12 is rotated clockwise about axis 26 until a sensor (not shown) senses a reflective patch on the drive wheel 32, indicating alignment of the outer tube slot 14 with the inner tube slot 18 (FIG. 3b), and the drive motor is signaled to stop.

Next, with reference to FIGS. 4a–c, the winding mode will be described. The media 38 is fed into the center of the inner tube 16 through an opening 40 formed by the alignment of the inner tube slot 18 and the outer tube slot 14, as shown in FIG. 4*a*. The outer tube 12 is rotated clockwise in FIG. 4*b*, while the inner tube 16 remains stationary. The media 38 is forced to bend around the edge 42 of the outer tube slot 14 as it rotates, and friction causes the media 38 be pulled by the outer tube 12 in a clockwise direction. FIG. 4*b* shows the opening 40 in a closed position after sufficient rotation of the outer tube 12. The media 38 is wrapped around the edge 42 of the outer tube slot 14.

The inner tube 16 now rotates about axis 26 with the outer tube 12 during winding, due to the presence of the media captured between the inner and outer tube slot edges 44, 42, respectively. FIG. 4*c* shows that winding continues without relative rotation between the tubes, insuring that the opening 40 (FIG. 4*a*) remains in the closed position and keeps the leading edge 46 of the media 38 securely wrapped around the outer tube slot edge 42. The narrow opening 48 formed by the overlapping of the inner tube slot 18 and the outer tube slot 14 remains constant throughout rotation due to the roller clutch 24 (FIG. 2) connections between the inner and outer tubes. Without the roller clutches 24, the opening 40 (FIG. 4*a*) would open and the media 38 would slip out when the inner tube slot 18 rotated more than 180 degrees. As can be seen in FIG. 4*c*, the eccentrically mounted weights 34 urge the inner tube 16 to return to a position with its slot 18 facing downward, due to the force of gravity. The media 38 between the inner and outer tube slot edges 44, 42, respectively, prevents the inner tube 16 from rotating counterclockwise relative to the outer tube 12 and the roller clutches 24 (FIG. 2) prevent the inner tube 16 from rotating clockwise relative to the outer tube 12.

Winding continues until the take-up capacity of the enclosure has reached its limit or until unloading is otherwise needed. Referring to FIGS. 5*a–b*, the unwinding mode will be described. During unloading, the media 38 is pulled from the enclosure, reversing the rotation of the tubes 12, 16, as shown in FIG. 5*a*. The unwinding continues until the media 38 is completely unwound from the take-up roller assembly 10. During the final counterrevolution of the take-up roller assembly 10, pictured in FIG. 5*b*, the media 38 pulls out easily from between the tubes, even though the opening 48 is narrow, due to the small clearance 20 between the tubes 12, 16. The aligning mode may now be performed before winding media 38 again onto the take-up roller 10.

While this invention has been described in terms of a preferred embodiment, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What I claim and desire to secure by Letters of Patent of the United States are the following:

1. A take-up roller for winding a continuous recording medium, comprising:

an outer hollow cylindrical tube having a longitudinal slot and an inner hollow cylindrical tube having a longitudinal slot, said inner hollow cylindrical tube mounted concentrically within said outer hollow cylindrical tube;

drive means for rotationally driving said outer hollow cylindrical tube about a rotational axis; and, clutch means for allowing relative rotation between said outer and inner hollow cylindrical tubes in one direction about the rotational axis during rotation of said outer hollow cylindrical tube by said drive means and for preventing relative rotation between said outer and inner hollow cylindrical tubes in an opposite direction about the rotational axis.

2. A take-up roller according to claim 1, further comprising two eccentrically mounted weights fastened to said inner hollow cylindrical tube on opposite sides of said longitudinal slot of said inner tube, for orienting said inner tube with said longitudinal slot of the inner tube facing downward, and wherein said clutch means prevents relative rotation in said opposite direction against a rotational force of said weights.

3. A take-up roller according to claim 1, further comprising means for automatically aligning said longitudinal slots of said inner and outer hollow cylindrical tubes, including sensing means for sensing a particular orientation of said longitudinal slot of said outer hollow cylindrical tube and signaling means for signaling said drive means to cease rotation of said outer tube upon said sensing means sensing said particular orientation.

4. The apparatus according to claim 1, wherein said clutch means comprises a one-way roller clutch coupled to said inner hollow cylindrical tube and said outer hollow cylindrical tube.

5. A method for winding a continuous recording medium onto a take-up roller having a first hollow cylindrical tube with a first longitudinal slot, and a second hollow cylindrical tube with a second longitudinal slot mounted concentrically within the first tube, said method comprising the steps of:

aligning the first and second longitudinal slots of said first and second hollow cylindrical tubes respectively, by mounting eccentric weights on at least one of said first and second hollow cylindrical tubes;

inserting a leading edge of the continuous recording medium into the first and second hollow cylindrical tubes though an opening formed by the alignment of the first and second longitudinal slots;

rotating the first hollow cylindrical tube about a rotational axis relative to the second hollow cylindrical tube thereby closing the opening and wrapping the recording medium around an edge of the first longitudinal slot, creating a friction force between the first and second cylindrical tubes such that the second cylindrical tube rotates with the first cylindrical tube; and, allowing relative rotation between said first and second hollow cylindrical tubes in one direction about the rotational axis and preventing relative rotation between said outer and inner hollow cylindrical tubes in an opposite direction about the rotational axis.

6. A motorized take-up cassette for winding and unwinding a continuous recording medium on a take-up roller enclosed within said take-up cassette, comprising a take-up roller mounted for rotation within a light-resistant enclosure, said take-up roller having end shafts supporting said take-up roller for rotation within said enclosure, one of said end shafts extending through an end wall of said enclosure and having a drive wheel mounted on said end shaft on an outer side of said enclosure for engaging with a drive means external to said enclosure for rotating said drive wheel and said take-up roller about a rotational axis, said take-up roller comprising an outer hollow cylindrical tube having a longitudinal slot and an inner hollow cylindrical tube having a longitudinal slot, said inner hollow cylindrical tube mounted concentrically within said outer hollow cylindrical tube, and further comprising clutch means for allowing relative rotation between said outer and inner hollow cylindrical tubes in one direction about the rotational axis during rotation of said outer hollow cylindrical tube by said drive means and for preventing relative rotation between said outer and inner hollow cylindrical tubes in an opposite direction about the rotational axis.

7. The apparatus according to claim 6, wherein said clutch means comprises a one-way roller clutch coupled to said inner hollow cylindrical tube and said outer hollow cylindrical tube.

8. The apparatus according to claim 6, further comprising means for automatically aligning said longitudinal slots of said outer and inner hollow cylindrical tubes, including sensing means for sensing a particular orientation of said longitudinal slot of said outer hollow cylindrical tube and signaling means for signaling said drive means to cease rotation of said outer tube upon said sensing means sensing said particular orientation.

9. The apparatus according to claim 8, wherein said means for automatically aligning said longitudinal slots of said outer and inner hollow cylindrical tubes includes eccentrically mounted weights fastened to said inner hollow cylindrical tube that bias said inner tube to rotate automatically to a particular orientation of said longitudinal slot of said inner tube.

10. The apparatus according to claim 6, wherein one of said outer and inner hollow cylindrical tubes has eccentrically mounted weights attached to align the longitudinal slot of said one to a particular orientation, and wherein said clutch means prevents relative rotation between said outer and inner tubes in said opposite direction against a rotational force of the eccentrically mounted weights.

* * * * *